(12) United States Patent
Kim

(10) Patent No.: US 9,762,723 B2
(45) Date of Patent: *Sep. 12, 2017

(54) DEVICE AND METHOD FOR CONTROLLING ALARM ACCORDING TO UNINTENDED FUNCTION IN MOBILE TERMINAL

(71) Applicant: Samsung Electronics Co., Ltd., Gyeonggi-do (KR)

(72) Inventor: Ki Youn Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 19 days.

This patent is subject to a terminal disclaimer.

(21) Appl. No.: 15/165,042

(22) Filed: May 26, 2016

(65) Prior Publication Data

US 2016/0269544 A1    Sep. 15, 2016

Related U.S. Application Data

(63) Continuation of application No. 12/293,400, filed on Nov. 10, 2011, now Pat. No. 9,369,560.

(30) Foreign Application Priority Data

Nov. 11, 2010  (KR) .......................... 10-2010-0111950

(51) Int. Cl.
| | |
|---|---|
| *H04Q 7/10* | (2006.01) |
| *H04M 1/725* | (2006.01) |
| *H04M 1/68* | (2006.01) |

(52) U.S. Cl.
CPC ......... *H04M 1/72577* (2013.01); *H04M 1/68* (2013.01)

(58) Field of Classification Search
CPC .. H04L 63/145; H04L 63/1416; G06F 21/316
(Continued)

(56) References Cited

U.S. PATENT DOCUMENTS 7,202,889 B2    4/2007  Suzuki et al.
7,480,655 B2 *  1/2009  Thomas .................. G06F 21/52
(Continued)

FOREIGN PATENT DOCUMENTS

JP           2008-311775 A     12/2008

OTHER PUBLICATIONS

Liang Cai et al., Defending Against Sensor-Sniffing Attacks on Mobile Phones, MobiHeld '09 Proceedings of the 1st ACM Workshop on Networking, Systems, and Applications for Mobile Handhelds, Aug. 2009, pp. 31-36.

(Continued)

*Primary Examiner* — Ajit Patel
*Assistant Examiner* — Julio Perez
(74) *Attorney, Agent, or Firm* — Cha & Reiter, LLC

(57) ABSTRACT

A method and device for controlling generation an alarm in a mobile terminal is provided. The method comprises: checking whether a request to operate a microphone has been made by an application intended by a user that initiates an audio processing function when a request to operate the microphone is received; generating an alarm indicating an abnormal microphone operation if the request is determined not to be from an intended application; and turning off the microphone in response to the indication of the abnormal microphone operation.

19 Claims, 3 Drawing Sheets

(58) Field of Classification Search
USPC .............................................. 455/418; 726/3
See application file for complete search history.

(56) References Cited

U.S. PATENT DOCUMENTS

| | | | |
|---|---|---|---|
| 7,509,683 B2 | 3/2009 | Decime | |
| 7,570,283 B2 | 8/2009 | Sato et al. | |
| 7,707,632 B2 | 4/2010 | Nath et al. | |
| 8,490,176 B2 | 7/2013 | Book et al. | |
| 8,566,946 B1 | 10/2013 | Aziz et al. | |
| 9,032,318 B2 * | 5/2015 | Louch | G06F 21/552 |
| | | | 715/766 |
| 9,202,049 B1 * | 12/2015 | Book | G06F 21/56 |
| 2006/0117091 A1 | 6/2006 | Justin | |
| 2007/0058807 A1 * | 3/2007 | Marsh | G06F 21/10 |
| | | | 380/44 |
| 2010/0050261 A1 | 2/2010 | Park | |
| 2010/0075632 A1 | 3/2010 | Kim | |
| 2010/0102979 A1 | 4/2010 | Huang et al. | |
| 2010/0205667 A1 | 8/2010 | Anderson et al. | |
| 2012/0042358 A1 * | 2/2012 | Kondur | G06F 21/316 |
| | | | 726/3 |

OTHER PUBLICATIONS

Korean Search Report dated Sep. 6, 2016.

* cited by examiner

DEVICE AND METHOD FOR CONTROLLING ALARM ACCORDING TO UNINTENDED FUNCTION IN MOBILE TERMINAL

CROSS REFERENCE TO RELATED APPLICATIONS

This application is a Continuation of U.S. patent application Ser. No. 13/293,400 filed on Nov. 10, 2011 which claims, pursuant to 35 USC 119, priority to, and the benefit of the earlier filing date of, that patent application filed in the Korean Intellectual Property Office on Nov. 11, 2010 and afforded Serial No. 10-2010-0111950, the entire contents of which are incorporated by reference, herein.

BACKGROUND

Field of the Invention

The present invention relates to the field of mobile terminals, and more particularly, to a device and method for generating an alarm upon detection of the execution of an unintended function.

Description of the Related Art

Generally, a standard (e.g., a first generation) mobile terminal cannot download and use an external application. Hence, it is not possible to perform various functions by downloaded applications. However, currently available (e.g., second and third generation) mobile terminal (commonly referred to as "Smart Phones") are intelligent terminals that have and support digital communication functions such as Internet communication, web browsing and information search, etc. These smart phones can also install applications desired by user through the internet connection, a wireless connection or a hardwired connection. The benefit of the smart phone is that hundreds of applications can be installed, added or deleted as desired by user unlike a first generation mobile terminal which includes only functions that have been pre-installed.

When using a smart phone, a user can connect to the Internet not only through a wireless Internet connection, but also through various other methods (e.g., wired internet) and may use various browsing programs. Further, when using the smart phone, it is possible to customize an interface that fits a user's desired interaction with one or more different applications programs. It is also possible to share applications between smart phones that are using the same operating system (OS).

However, while such a smart phone has an advantage in that various functions can be performed by connecting to an Internet-type network, it becomes possible that a program, for example, viruses, malware and spyware, which is not desired by the user, can be installed without the user's knowledge. Spyware refers to a software program that sneaks into the computer of the smart phone and spies on the user's use of the smart phone. The spyware program may also capture important personal information and transmit this information to unauthorized parties without the user knowing that the information is being transmitted. The spyware can be installed when downloading a software program which is freely provided to the public on the Internet or some other public network and the user has requested. That is, when using a smart phone an undesired spyware (or virus or malware) program can also be downloaded when the user downloads a desired program or application.

For example, user's voice can be wiretapped by the spyware program that is downloaded and installed without the user's knowledge, or the user and the user's surrounding environment images can be transmitted through a camera. The unauthorized use of the user's own smart phone to reveal information regarding the user without the user's permission and knowledge is becoming an ever more increasing problems as user's place more and more personal information on their smart phones.

Therefore, there is a need for controlling operation of input devices, such as a microphone and a camera, etc. so that undesired functions or operations are detected and prevented from being performed even if spyware programs are downloaded onto the smart phone.

SUMMARY

The present invention has been made in view of the above problems, and provides a device and method for alerting a user in case an input device is operated in an unintended situation when the input devices are operated.

The present invention further provides a device and method for alerting the user if a microphone is operated, or an application, which captures voice data during a voice call, is operated when the smart phone is not in the audio signal processing mode.

The present invention further provides a device and method for notifying a user when the camera operation has not been requested or when an application, which is not an application requested by a user in a camera operating mode, processes camera data.

In accordance with an aspect of the present invention, a method for controlling generation of an alarm in a mobile terminal is disclosed. The method includes determining whether a request to operate a microphone has been made by an application intended to use an audio processing function when a request to operate the microphone is received, generating an alarm in response to the determination of an abnormal microphone operation if the request is determined to be from an application not authorized to request microphone operation and turning off the microphone in response to the determination of an abnormal microphone operation.

In accordance with another aspect of the present invention, a method for generating an alarm in a mobile terminal includes determining whether a request to operate a camera has been made by an application authorized to use the camera, generating an alarm when the request is determined to be from an application not authorized to use the camera and responsive to an input command turning off the camera operation.

In accordance with another aspect of the present invention, a device for controlling an alarm of a mobile terminal includes: a CODEC that codes and decodes voice data, a microphone operation unit that operates a microphone, a speaker operation unit that operates a speaker, a touch screen that displays key data and operation state, a log table that stores log data associated with an unintended microphone operation; and a controller that alerts a user of an abnormal microphone operation through the speaker operation unit and a touch screen if a request to operate the microphone has been made by an application unintended by user.

In accordance with another aspect of the invention, a device comprising a processor in communication with a memory, the memory including code, which when accessed by the processor causes the processor to execute the steps of receiving a request to initiate operation of a data collection device, determining whether the request is initiated by an application authorized to request operation of the data collection device, responsive to a determination of the request being from an application not authorized to request operation of the data collection device, issuing commands to terminate operation of the data collection device and generating an alarm indication of the determination of an unauthorized request for data collection operation, the alarm indication being at least one of: a visual indication, an audio indication and a vibrational indication.

As described above, the present invention can alert the user so that illegal wiretapping or acquisition of images or data can be prevented in a mobile terminal like a smart phone.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The present invention determines whether an input device of a smart phone is being normally operated when the input device is operated, and provides an alarm to a user of the operation of the input device if the operation of the input device is unintended. For example, in case the smart phone is not in a calling state and if a microphone is operated for capturing audio signals, it is determined whether the application that requires operation of the microphone is authorized to request operation of the microphone. If such an application is not authorized to request operation of the microphone, the operation of the microphone is deemed to be abnormal (unauthorized) and the user is provided an alarm to indicate the abnormal or unauthorized operation. Further, if an operation for controlling an interface to a CODEC (coder/decoder) for capturing voice data is generated when the smart phone is not in a calling state, such an operation is sensed and again indicated to be an abnormal operation and an alarm is provided to the user.

Figure 1:
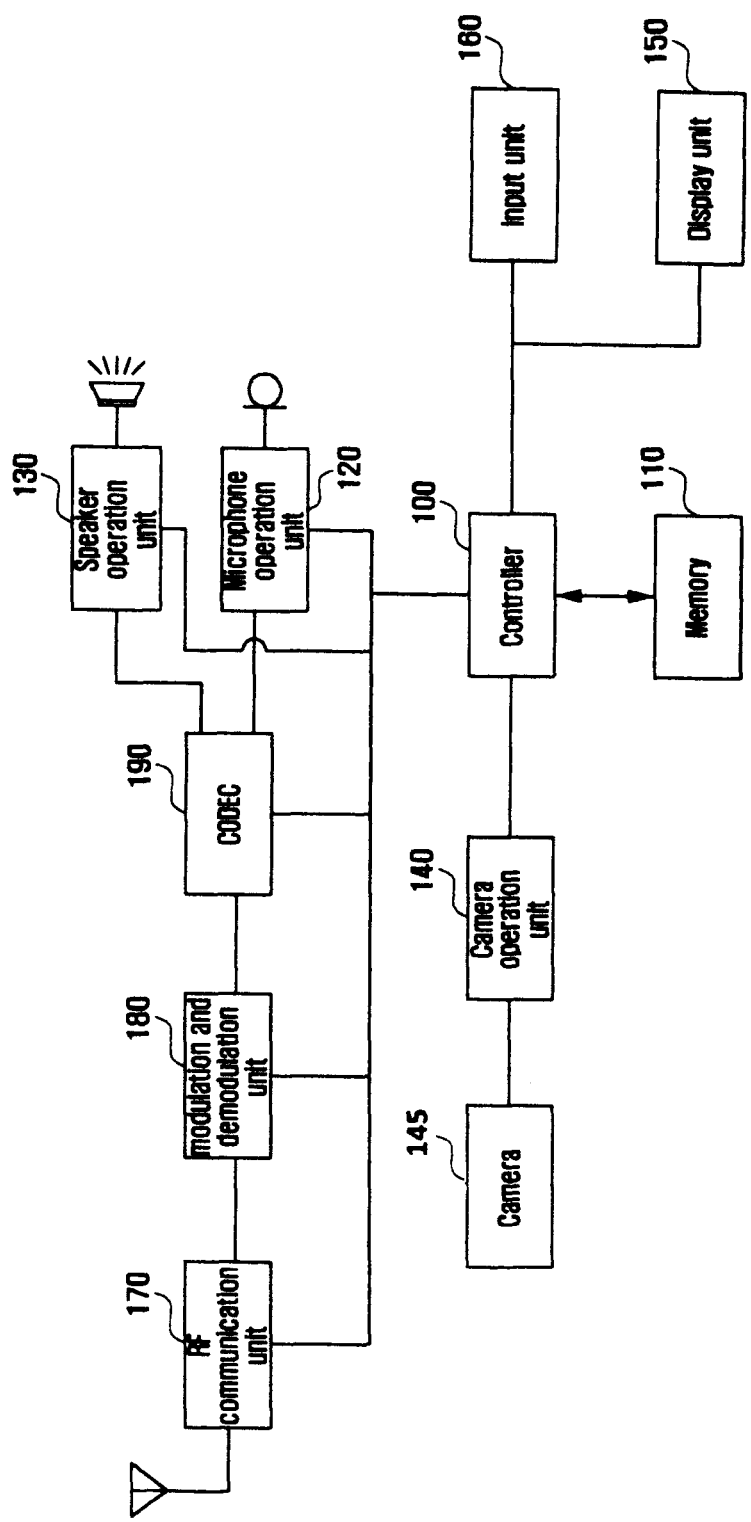
FIG. 1 illustrates a configuration of a mobile terminal for alarming a user of an abnormal operation of an input device according to an exemplary embodiment of the present invention.

FIG. 1 illustrates a configuration of a mobile terminal for providing an alarm to a user indicating a determined abnormal operation of an input device according to an exemplary embodiment of the present invention.

Referring to FIG. 1, a RF communication unit 170 frequency-converts transmitted signals at the baseband frequency band the RF band signals and amplifies the power of the signals in order to output the signals through an antenna. The RF communication unit further low-noise-amplifies received RF signals and frequency-converts the signals into the signals at the baseband frequency. The RF communication unit then outputs the converted signals. That is, the RF communication unit 170 may comprise a RF transmitter and a RF receiver.

A modulation and demodulation unit 180 (MODEM) modulates signals to be transmitted in a preset modulation method and outputs the modulated signals to the RF communication unit 170. The MODM further demodulates the modulated signals outputted from the RF communication unit 170 and outputs the demodulated signals. The modulation and demodulation unit 180 can be, for example, a MODEM consisting of a modulator and a demodulator, and can use an orthogonal frequency division multiplexing access (OFDMA) or code division multiple access (CDMA) method, etc.

The CODEC 190 codes the signals to be transmitted and outputs the coded signals to the modulation and demodulation unit 180. The CODEC 180 further decodes the demodulated signals outputted from the modulation and demodulation unit 180 and outputs the decoded signals. The CODEC 190 may comprise a coder and a decoder. Further, the CODEC may comprise an audio CODEC that processes audio signals and a video CODEC that processes video signals.

The microphone operation unit 120 converts voice and sound (hereinafter, called "audio signals") inputted from a microphone (MIC) into electric signals, and outputs the electric signals to the CODEC 190. The speaker operation unit 130 operates a speaker (SPK) and converts signals outputted from the CODEC 190 into audio signals. The key input unit 160 inputs data and commands generated from keys to a controller 100. The display unit 150 displays the operational state of a mobile terminal and displays data of various applications selected by user. Here, the display unit 150 and the key input unit 160 can be implemented as an integrally formed touch screen. The exemplary embodiment of the present invention assumes that the display unit 150 and the key input unit 160 are a touch screen.

The camera operation unit 140 processes image signals obtained from a camera (145). Here, the camera operation unit 140 can perform a function that converts analog image signals generated from the camera (145) into digital image data, and preprocesses the digital image data. The camera operation unit 140 may further include an image processing unit, and in such a case, the image processed signals can be displayed through the display unit 140 under the control of the controller 100. In case the CODEC 190 includes a video CODEC (not shown), the output of the camera operation unit 130 can be transmitted to the video CODEC of the CODEC 190, and compression and image processing operation can be performed. The image processed camera signals can be outputted and displayed on the display unit 150.

A memory 110 may comprise a program memory storage area (not shown) that stores programs for controlling operation of a mobile terminal and programs for providing an alarm when an operation of input devices is detected that is not operated by a normal procedure. The memory 110 further may include a data memory storage area (not shown) that stores data generated during execution of a program according to an exemplary embodiment of the present invention. In particular, the data memory storage area may further include a log table that stores or records or logs information according to the operation of each input device (e.g., a microphone 120 and/or a camera 145) according to an exemplary embodiment of the present invention.

The controller 100 controls overall operation of a mobile terminal according to an exemplary embodiment of the present invention. The controller 100 controls functions or applications related with calling and communication by controlling the RF communication unit 170, the modulation and demodulation unit 180 and the CODEC 190. Further, the controller 100 controls execution of applications according to user's request, and performs a communication function with the external network by controlling the RF communication unit 170, the modulation and the demodulation unit 180 and the CODEC 190, etc. Further, in case a microphone (120) or a camera (145) is operated by an unintended operation, the controller 100 controls a function to provide an alarm to the user of the determination that an input device has been operated by an unintended operation. At this time, the alarm or notice of unintended operation can be performed through the speaker (SPK) and/or the display unit 150. In an alternative embodiment, the alarm can be provided by vibrating the smart phone through a vibrator (not shown).

The controller 100 controls an application processor function. Here, the application can be an application related with calling of a mobile terminal, an application related with image processing, an application related with a social network service (SNS) and/or an application related with communication, etc.

Typically, the smart phone can be connected to the external network through an Internet communication, or another similar network configuration, and can download various kinds of applications having various functions. During the download of one or more desired programs by the use, and unintended programs (a spyware program) and desired by the user, can also be downloaded (as is well-known in the computer arts field). In addition, input devices can be operated by such a spyware program regardless of the user's intention, and the user's voice and image information of surrounding environment, etc. can be provided to devices external to the user's smart phone without the user's permission. Here, the input device can be, for example, a microphone or a camera. The input device could also include a key pad, where key depresses are captured. This provides a method of capturing user passwords, for example. Further, an exemplary embodiment of the present invention may include a program (e.g., a vaccine program) that detects programs, which are downloaded and are installed regardless of user's intention (e.g., spyware, adware, worms, viruses etc.) and when a program like a spyware is downloaded, the controller 100 can detect the program and register the program as an unintended application. Therefore, in an exemplary embodiment of the present invention, an unintended application or abnormal application operation refers to an application that could also be registered as an illegal program, or an application that does not need operation of an input device but operates a microphone or a camera, etc.

Hence, in the case of a smart phone, the case where an input device such as the microphone or the camera is operated by an application requested by user should be distinguished from the case where the input device (i.e., microphone or the camera) is operated by an unintended application (i.e., the operation of the application has not been requested by the user). That is, if an input device is operated by an unintended application, it is desirable for the unintended operation of the input device is detected and a notice of unintended operation or an alarm be provided to the user so that the user has knowledge of the unintended operation. Further, in case voice or image data processed if the CODEC 190 is accessed by an unintended application, it is desirable for the unintended operation be detected and notice of the operation be provided to the user.

According to an exemplary embodiment of the present invention in providing an alarm of an audio service requested by an unintended application in a smart phone, when operation of a microphone is requested, it is examined whether the audio processing function has been requested by an application intended by user, and if the operation of the microphone is not intended by the user, an abnormal microphone operation is determined and an alarm is provide to the user. In addition, key data for turning off the operation of the microphone being operated is displayed. Further, responsive to the detection of an input of key data, the operation of the microphone is terminated.

In the above method for providing an alarm or notification of unintended application operation, if a microphone and a speaker are operated in a calling mode, a calling service is performed, and it is determined whether an unintended application, which accesses audio data during the calling service process, exists. If an unintended application exists, the generation of an abnormal audio data access alarm or notification is issued and key data for turning off the operation of the microphone is displayed. If the key data is inputted, the operation of the microphone is overridden and the use of the microphone is terminated, and not the unintended application.

In one aspect of the invention, the method for providing an alarm or a notification of unintended application operation, displays the unintended application (i.e., characteristic such as name, date of operation, date of download, etc.) and an alarm generation time through the display unit. In addition, the alarm may also be one of an alarming sound and/or a vibration. The information regarding the detection of the unintended application operation is recorded or logged as an alarming event in a log table.

Figure 2:
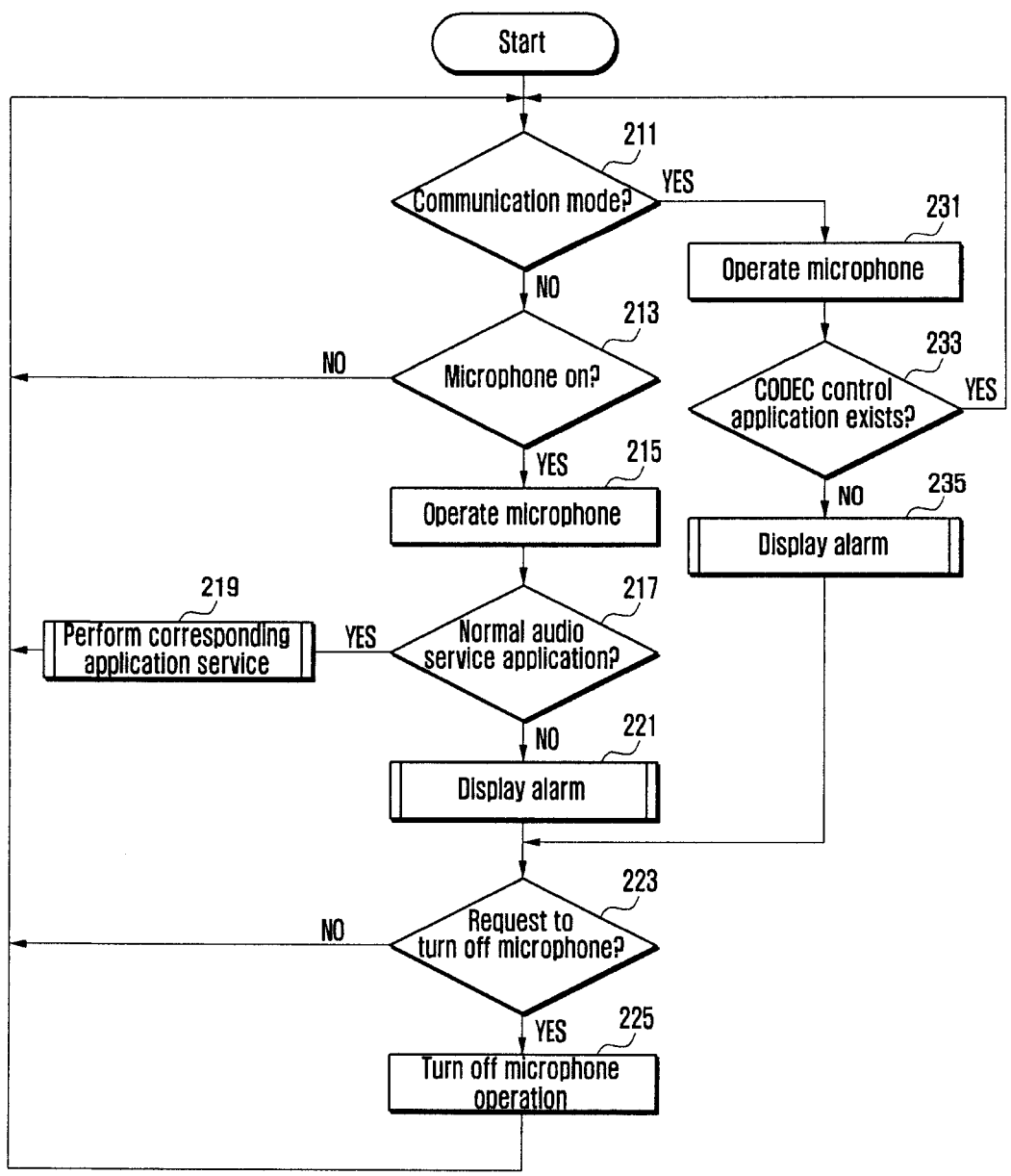
FIG. 2 is a flowchart illustrating a procedure for providing an alarm when a microphone is operated by an unintended application in a mobile terminal according to an exemplary embodiment of the present invention.

FIG. 2 is a flowchart illustrating a procedure of providing an alarm indication when a microphone, or other device, is operated by an unintended application in a mobile terminal according to an exemplary embodiment of the present invention. The alarm or alarm indication may be at least one of a visual, audio and vibrational alarm or alarm indication.

Referring to FIG. 2, applications, which can control the CODEC 190 when the mobile terminal is not in the calling mode, are well known in the art. For example, applications that perform a search mode wherein a connection to the Internet is made by voice to search for desired data, and a control mode that controls operation of a mobile terminal by voice, can be some examples of such applications. In these applications, the microphone should be kept on. Hence, in case a microphone is operated when the mobile phone is not in the calling mode, the controller 100 senses the operation (211 and 213) of the microphone and receives user's audio signals through the microphone operation unit 120 to be transmitted to the CODEC 190 (215). Note that it is predetermined whether microphone is to be operated or not for each of an applications.

Further, the controller 100 examines whether an application operating the microphone has been intended by the user (217). The controller 100 has knowledge of applications where a microphone and/or a camera is operated among applications being executed, and such applications can be stored as a table in the memory 110. That is, the memory 110 can store a table of identification information of applications authorized to use, or requiring the operation of, a microphone (or other similar device). Further, for applications that do not operate the microphone and/or the camera (or other similar device), a table containing the identification information of such applications may be generated and stored in the memory. Here, if the operation of a desired application is requested by the user, the controller 100 can check in the memory 110 whether the application is an application that requires the operation of a microphone and/or a camera, or an application wherein use of a microphone and/or a camera is considered an abnormally operation (i.e., does not require a microphone and/or camera operation). At this time, if the application is an application that performs a voice search mode, for example, the controller 100 senses the operation of the corresponding application (217) and performs the service corresponding to the application (219).

However, if the controller determines there is an execution of an application that is not intended by the user, the controller 100 senses the situation at step 217 and provides an alarm or notification to the user of an abnormal operation of a device (e.g., the microphone) (221). An unintended application, as described above, can be an application that is downloaded and installed regardless of the user's intention, or an application, that does not need a microphone, but is requesting operation of the microphone, for example. In such a case, the controller 100 performs an alarm generation operation that informs the user of a possibility of data capture and potential privacy invasion, through the mobile terminal at step 221 (e.g., display the alarm). The method for providing an alarm or notification of unintended application operation can display the unintended application that accesses the audio signals, for example, on the display unit 150. Further, when the alarm (or notification) message is outputted, the controller 100 can also display a soft key, on the display unit 150, for turning off the operation of the microphone. In such a case, if a user touches the key (i.e., provides an input), the controller 100 can sense the touch (input) and turn off the operation of the microphone; thus overriding the execution of the unintended application operation. Further, the alarm indication, e.g., a sound, can be generated through the speaker operation unit 130, or the alarm indication can be performed through a vibration of the mobile terminal by the operation of a vibrator (not shown). Further, in case it is determined that audio data is captured by an unintended application at step 221, the controller 100 can record or log information including time and application ID, etc. in the log table of the memory 110 (235).

Thus, according to the method described herein, a user can be warned of a potential "wiretapping" (i.e., unintended operation of an application) of the mobile terminal by the generation of an alarm, and can further stop (override) such an operation of the device being operated by the unintended application. If a user requests a stop of the operation of the device being operated by the unintended application, the controller 100 senses the request (223) and turns off the operation of the device (225). At this time, the operation, which turns off operation of the device, can be performed through the microphone operation unit 120, and/or the CODEC 190, which can be controlled to block the route of audio data access by the application.

Further, in FIG. 2, if the mobile terminal is in the calling mode (voice call or video call mode), the controller 100 senses the mode (211), controls the transmission of voice signals, which are received from the microphone through the microphone operation unit 120, to the CODEC 190, and controls the transmission of the audio signals, which are decoded in the CODEC, to the speaker through the speaker operation unit 130 (231). That is, in the calling mode, the controller 211 controls voice signals, which are transmitted and received, to be processed through the microphone and the speaker at step 231. Further, in the calling mode, the controller 100 examines whether an unintended application, which accesses audio data from the CODEC 190, is in operation (233). That is, the controller 100 examines whether there are applications that try to control the CODEC that processes audio data generated in the calling mode other than the application that provides the calling mode service. If there is no other applications that are trying to control the operation of the CODEC in the calling mode,—i.e., there is no application that tries to capture audio data during a call,—the controller 100 returns to step 211 and controls a normal operation of the calling mode.

However, in case it has been determined that there is an operation of an unintended application that tries to control the interface of CODEC 190 at step 233, the controller 100 performs an alarm or notification operation that informs the user of the potential wiretapping (235). The alarming method can display the existence of the detected unintended application that is accessing calling data on the display unit 150, can generate an alarm sound through the speaker operation unit 130, and/or can cause a vibration of the mobile terminal by operating a vibrator (not shown). Further, in case it is determined that calling data is captured by the operation of the unintended application at step 233, the controller 100 can record or log characteristic information regarding the unintended application (e.g., time and application ID, etc.) in the log table of the memory 110 at step 235. Thereafter, the controller 100 can turn off operation of the device or maintain the calling mode (223). Here, the codec is not turned off. The audio path of the microphone is disconnected in a codec.

As described above, in case a microphone is controlled to be turned on, or an unintended application tries to control the CODEC 190 to access audio data during a calling state, the controller 100 can provide an alarm to the user of the existence of the operation of an unintended application by a vibration, an alarming sound and/or an alarming display data.

At this time, in case an unintended application, which tries to turn on the microphone to capture voice or wiretap surrounding situations when the smart phone is not in a calling state, the smart phone user can be provided the information of the unintended operation through an alarm. In the illustrative case provided herein, where the device being operated is the microphone, an application that which tries to control the CODEC interface to capture audio data during a call that is not intended to operate the microphone is indicated and an indication of the operation is provided to the user by an alarm. Secondly, according to a method for controlling the presentation of an alarm for a camera operation initiated by an unintended application, when the operation of the camera is requested, it is determined whether the request has been made by an application intended by the user, and if the request is not intended by the user, a determination of an abnormal camera operation is made and an alarm or notification of unintended operation of the camera is provided to the user. In addition, key data for turning off the unintended operation of the camera is displayed. Further, if in response to the presented key data, an input is detected, the camera operation is terminated by overriding the operation of the application that is operating the camera.

Further, if the camera operation mode is performed, image data obtained by the camera is processed, and an examination is performed to determine whether a plurality of applications, which access image data in the image processing process, exist. If a plurality of applications exist. If it is determined that at least one unintended applications exists among the plurality of applications currently executing, an abnormal image data access is determined and an alarm indication is provided to the user as previously described. In addition a key data for turning off the operation is displayed. Further, if the key data is inputted, the operation of the camera is terminated.

Further, the application ID and alarm generation time are then displayed on the display unit and the alarm may be one of generating a display image, an alarm sound and/or a vibration. In addition, information regarding the alarm is recorded as an alarming event in the log table.

Figure 3:
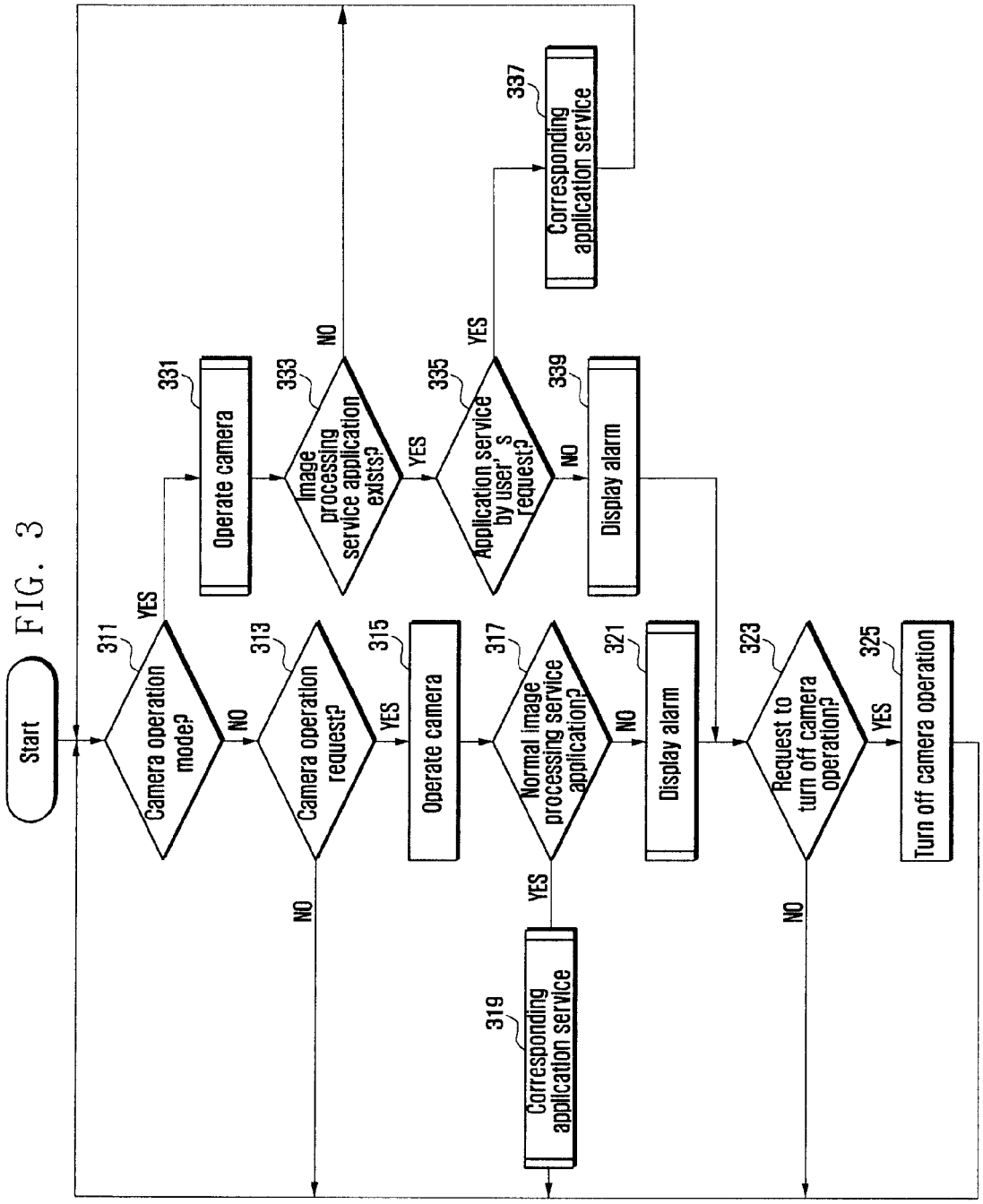
FIG. 3 is a flowchart illustrating a procedure of for providing an alarm when a camera is operated by an unintended application in a mobile terminal according to an exemplary embodiment of the present invention.

FIG. 3 is a flowchart illustrating a procedure of providing an alarm to a user when a camera is operated by the operation of an unintended application in a mobile terminal according to an exemplary embodiment of the present invention.

Referring to FIG. 3, the controller 100 examines whether the mobile terminal is in a camera operation mode (311). If the camera operation is requested when the mobile terminal is not in the camera operation mode, the controller 100 senses such a state or condition (313) and operates the camera through the camera operation unit 140 (315), for processing image signals obtained from the camera. As described above, the camera operation unit 140 can perform an A/D conversion and image preprocessing function, and is processed through the video CODEC and is authorized by the controller 100 to access the video CODEC. In such a case, the controller 100 compresses (codes) video data obtained by the user's request and stores the compressed data in the memory 110 or displays the data in the display unit 150, or when in the communication mode, the controller 100 compresses the video data and transmits the compressed data.

Thus, after the camera is operated, the controller 100 examines whether the application, which operates the camera, is an image processing service application intended by the user (317). Here, the camera operation mode refers to an operation mode that the user requests operation of the camera and the operation can be a camera photographing mode, an audio/video mode or a video call mode, etc. That is, an application, which operates the camera in response to a user's intention, can be one of a camera photographing mode or a video call mode, etc. Further, if the application is a normal image processing service application, the controller 100 senses the normal application (317) and provides the service of the application (319).

However, if the application is an image processing service application unintended by the user at step 317, the controller 100 provides an alarm of an abnormal camera operation (321). Here, as described above, the alarm can be performed through at least one of the display unit 150, a speaker and/or a vibrator, etc. Further, the controller 100 can record or log information regarding the application that requested the camera operation and the time of the operation in the log table of the memory 100 to display (and record) the abnormal camera operation at step 321. Further, the controller 100 can display a soft key for turning off the operation of the camera at step 321. In the above state, if a user requests turning off the operation of the camera (S323), the controller 100 can turn off the operation of the camera (325).

Further, at step 311, if the mobile terminal is in the camera operation mode, the controller 100 operates the camera and processes data obtained from the camera (331). Thereafter, the controller 100 examines whether multiple applications that process camera data are operating (333). In case camera data is being processed by a plurality of applications, the controller 100 examines whether the application services are operated in response to a user's request (335). If camera data is controlled by the execution an unintended application, the controller 100 senses the situation (335), performs an alarm generation operation (339) and proceeds to step 323 to turn off the camera operation.

As described above, if a camera operation is requested, the controller 100 examines whether the request is made by an application intended by the user. If the request has been made by an application intended by user, the camera is operated so that the application can control the camera. However, if the request has been made by an application unintended by the user, the controller 100 provides an alarm indication of the situation and records or logs associated information. Further, if the access of camera data is controlled by an unintended application while the camera is operated, the controller 100 provides an alarm indication of the situation and records or logs information regarding the detected unintended application.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

Although the invention has been described with regard to a microphone and camera function, it would be understood that the principles of the invention apply to any data collection type element of a mobile terminal, wherein a microphone and a camera function are examples of devices that collect audio and visual/audio data, respectively.

What is claimed is:
1. An apparatus comprising:
a camera;
a touch screen;
memory; and
a processor, coupled to the memory, adapted to:
identify a request for an operation of the camera from an application executed at the apparatus;

determine whether the application is authorized for the operation of the camera;

based at least in part on a determination that the application is unauthorized for the operation of the camera, display a user interface via the touch screen to receive a user input to disallow the operation of the camera for the application; and disable the operation of the camera for the application in response to the user input received with respect to the user interface.

2. The apparatus of claim 1, wherein the operation of the camera comprises a first function to capture a still image or a second function to record a video.

3. The apparatus of claim 1, wherein the processor is adapted to:

enable the operation of the camera for the application in response to another user input received with respect to the user interface.

4. The apparatus of claim 1, wherein the processor is adapted to:

turn off the camera if the camera has been turned on, as at least part of the disabling.

5. The apparatus of claim 1, wherein the processor is adapted to:

store log information associated with the camera in the memory based at least in part on the determination, the log information including an identifier of the application or a time at which the request is identified.

6. The apparatus of claim 1, wherein the memory stores one or more identifiers each corresponding to an unauthorized application for an access to the camera, and wherein the processor is adapted to:

perform the determining based at least in part on an outcome of comparison of an identifier of the application with at least one of the one or more identifies stored in the memory.

7. The apparatus of claim 6, wherein the unauthorized application comprises a spyware.

8. The apparatus of claim 1, wherein the processor is adapted to:

present an alarm based at least in part on the determination.

9. The apparatus of claim 8, wherein the processor is adapted to:

present, as at least part of the presenting of the alarm, a vibration or a light.

10. An apparatus comprising:

an input device, wherein the input device comprises a camera or a microphone;

a touch screen;

memory to store an application; and a processor, coupled to the memory, adapted to:

execute the application;

identify a request to access the input device from the application;

determine whether the application is authorized to access the input device;

based at least in part on a determination that the application is unauthorized to access the input device, display a user interface via the touch screen to receive a user input to disallow an access by the application to the input device; and disable the access by the application to the input device in response to the user input received with respect to the user interface.

11. The apparatus of claim 10, wherein the processor is adapted to:

identify, as at least part of the request, a first request for a first function to capture a still image or a second request for a second function to capture an audio signal.

12. The apparatus of claim 10, wherein the processor is adapted to:

enable the access by the application to the input device in response to another user input received with respect to the user interface.

13. The apparatus of claim 10, wherein the processor is adapted to:

turn off the input device if the input device has been turned on, as at least part of the disabling.

14. The apparatus of claim 10, wherein the processor is adapted to:

store log information associated with the input device in the memory based at least in part on the determination, the log information including an identifier of the application or a time at which the request is identified.

15. The apparatus of claim 10, wherein the memory stores one or more identifiers each corresponding to an unauthorized application for an access to the input device, and wherein the processor is adapted to:

perform the determining based at least in part on an outcome of comparison of an identifier of the application with at least one of the one or more identifies stored in the memory.

16. A computer-readable storage device storing instructions that, when executed by a computer, cause the computer to perform operations comprising:

identifying, at an electronic device including an input device and a touch screen, a request to access the input device from an application executed at the electronic device, wherein the input device comprises a camera or a microphone;

determining whether the application is authorized to access the input device;

based at least in part on a determination that the application is unauthorized to access the input device, displaying a user interface via the touch screen to receive a user input to disallow an access by the application to the input device; and disabling the access by the application to the input device in response to the user input received with respect to the user interface.

17. A computer-readable storage device of claim 16, wherein the identifying comprises:

identifying, as at least part of the request, a first request for a first function to capture a still image or a second request for a second function to capture an audio signal.

18. A computer-readable storage device of claim 16, wherein the determining comprises:

storing log information associated with the input device based at least in part on the determination, the log information including an identifier of the application or a time at which the request is identified.

19. A computer-readable storage device of claim 16, further comprising: enabling the access by the application to the input device in response to another user input received with respect to the user interface.

* * * * *

UNITED STATES PATENT AND TRADEMARK OFFICE
CERTIFICATE OF CORRECTION

PATENT NO. : 9,762,723 B2
APPLICATION NO. : 15/165042
DATED : September 12, 2017
INVENTOR(S) : Ki Youn Kim It is certified that error appears in the above-identified patent and that said Letters Patent is hereby corrected as shown below:

On the Title Page

Item (63), Line 1 should read as follows:
--...Continuation of application No. 13/293,400, filed on...--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*